United States Patent
Smith

[15] 3,679,163
[45] July 25, 1972

[54] STEERING COLUMN MOUNTING BRACKET ASSEMBLY

[72] Inventor: George J. Smith, Alma, Mich.
[73] Assignee: Lobdell-Emery Manufacturing Co.
[22] Filed: March 6, 1969
[21] Appl. No.: 804,820

[52] U.S. Cl. ............................................. 248/223, 74/492
[51] Int. Cl. .......................................................... B62d 1/18
[58] Field of Search .................... 248/56, 205, 223, 224, 225;
24/1 SR, 230 SL; 287/131; 285/2, 304; 52/98, 99;
74/492, 493

[56] References Cited

UNITED STATES PATENTS

| 738,673 | 9/1903 | Graef | 24/230 SL |
| 839,047 | 12/1906 | Sylvester | 24/230 SL |
| 2,902,738 | 9/1959 | Owens | 24/230 SL |
| 2,029,089 | 1/1936 | Weirauch | 248/224 |
| 2,785,453 | 3/1957 | Wentz | 248/225 X |
| 2,895,345 | 7/1959 | McClure | 74/493 |
| 3,017,972 | 1/1962 | Saxe | 248/224 X |
| 3,270,996 | 9/1966 | Churchill et al. | 248/224 |
| 3,388,884 | 6/1968 | Eggler et al. | 248/224 |
| 3,392,599 | 7/1968 | White | 74/492 |
| 3,394,613 | 7/1968 | Curtindale et al. | 74/492 |

Primary Examiner—William H. Schultz
Attorney—Learman & McCulloch

[57] ABSTRACT

A break-away bracket assembly for releasably mounting an axially extending steering column to steering column support structure, and for other like purposes, wherein a first bracket part has an open ended aperture formed in one edge thereof. A second bracket part has an opening through which a securing member such as a bolt may extend and is mountable on the first bracket part. One of the bracket parts has an axially extending projection and the other bracket part has a socket receiving the projection which defines a retaining edge surface normally preventing separation of the projection from the socket but which may be stripped away under application of a predetermined axial separating force.

8 Claims, 4 Drawing Figures

PATENTED JUL 25 1972 3,679,163

BEST AVAILABLE COPY

INVENTOR.
GEORGE J. SMITH
BY
LEARMAN + McCULLOCH

STEERING COLUMN MOUNTING BRACKET ASSEMBLY

This invention relates generally to break-away bracket assemblies and more particularly to an improved mounting bracket assembly for vehicle steering columns whereby the steering column is connected to the vehicle body in such a manner that, upon application of a substantial impact on the steering wheel, the bracket parts separate to permit the steering column to be displaced downwardly. The invention is particularly concerned with the mounting of present day, collapsible steering columns of the character illustrated in U.S. Pat. Nos. 3,373,965 and 3,394,613, for instance. Prior art brackets, as exemplified in the patents mentioned, have not proved as satisfactory as desired and the present invention possesses advantages of an important nature.

One of the prime objects of the present invention is to provide a break-away bracket assembly for an axially extending steering column which utilizes axially extending interlocking parts which may be stripped to release the steering column for vertical collapsing movement upon the application of a predetermined axial force to the steering wheel.

Another object of the invention is to incorporate a mounting bracket assembly of the character described which prevents displacement of the steering column relative to the supporting structure under a load which is applied in the opposite axial direction to accordingly protect the driver if the force or impact is applied to the lower end of the steering column.

Another important object of the invention is to provide a bracket assembly wherein one of the parts may be economically formed from a commonly available plastic material.

Still another object of the invention is to provide a break-away bracket assembly of the character described wherein the molded plastic part which is used may be readily replaced once it has broken loose to prevent any rattle which otherwise might occur.

Another object of the invention is to provide a break-away bracket assembly which may be very simply conditioned for operation by simply assembling the parts and does not require plastic injection machinery for molding the parts of the assembly together after the parts are in assembled relation.

Still a further object of the invention is to provide a break-away bracket assembly having a minimum number of parts, which is of highly reliable construction, and yet can be more economically applied to vehicles to accomplish the purpose described.

Other objects and advantages will be apparent from the following description and drawings.

Referring now more particularly to the accompanying drawings it is to be understood that the interlocking parts of the break-away bracket assembly comprise a right angular metal bracket generally designated 10 and a second bracket part or pad generally designated 11. The bracket 10 is preferably formed of steel and the pad 11 is preferably a molded plastic part. A suitable plastic is injection molded polyurethane but it is to be understood that other plastics are also suitable and may be utilized.

Figure 1:
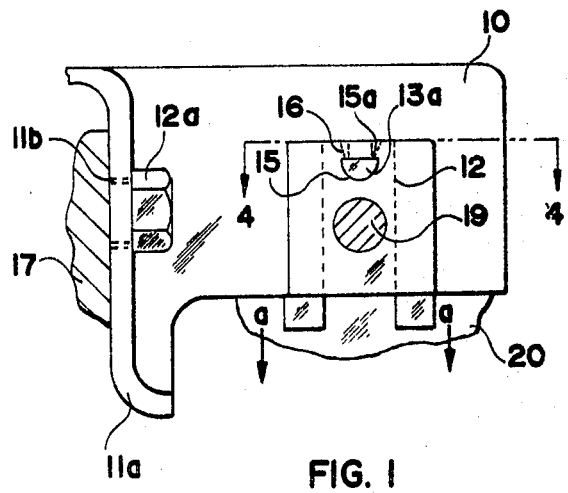
FIG. 1 is an elevational view showing the bracket assembly in position releasably supporting a steering wheel structure from the fire wall structure of the vehicle body.
Figure 2:
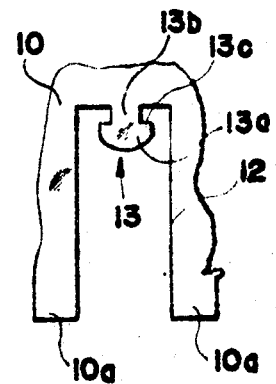
FIG. 2 is a similar fragmentary view of one of the bracket parts illustrating the locking projection thereon in particular.

As FIGS. 1 and 2 particularly indicate, the bracket 10 employs an open ended aperture 12, at the closed end of which protrudes a locking projection generally designated 13. The locking projection 13 is provided with a button-shaped head 13a and a reduced neck section 13b so as to define retaining edges 13c for a purpose which will be later described.

Figure 3:
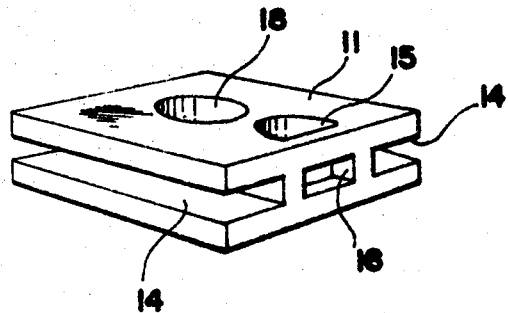
FIG. 3 is a perspective elevational view particularly illustrating the other bracket part which is preferably a plastic part.
Figure 4:
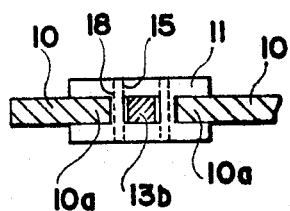
FIG. 4 is a sectional elevational view taken on the line 4—4 of FIG. 1.

As FIG. 3 indicates the pad 11 is provided with grooves 14 in its side edges so that it may slip over the marginal wall portions 10a bounding the open ended aperture 12. A socket 15 is provided in the part 11 to receive the head 13a of the locking projection 13 and a tapering passage 16 leads through the one end of the pad 11 to the socket 15 as shown. The passage 16 is of a size to permit the forceable entry of the head portion 13a of the locking projection 13. At its inner end the passage 16 is of a reduced width relative to the width of socket 15 so that the portions 13c of the locking projection 13 underlie the retaining edges 15a formed by socket 15. Typically the retaining edges 15a of socket 15 may be about 0.025 inch in extent on either side of the passage 16.

As might be imagined, it is a relatively easy assembly operation to simply fit the pad 11 on the bracket 10 so that the locking projection 13 is in position to enter the socket 15 and then to lightly tap the pad 11 to force the locking projection head 13a up into the socket 13 to locked position. Under a predetermined axially applied separating force applied for instance in the direction a, the locking projection head 13a is stripped from the socket 15. When this occurs, the retaining edges 15a strip away and later, when repairs are effected, it is a simple matter to substitute a new pad 11 for the stripped pad.

While conceivably the bracket 10 could be mounted on either the steering column structure or the fire wall of the vehicle, and likewise the pad 11, the bracket 10 is shown as having an angularly extending web 11a with openings 11b to accommodate bolts 12a which secure the bracket 10 to the fire wall or other suitable structure of the vehicle body 17. The pad 11 is provided with a bore 18 through which a bolt 19 may extend to secure the assembled bracket to the steering column structure via a steering column structure bracket 20 fixed thereto.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. A break-away bracket assembly for releasably mounting a steering column structure to steering column support structure, and for other like purposes, comprising: a bracket part adapted to be connected to one of said structures having an open ended aperture in one edge thereof interjacent its ends; said bracket part having a non-shearable locking projection with a reduced neck defining overhanging retaining edges; and a second bracket part adapted to connect with the other of said structures having a retaining socket with an entrance opening of slightly lesser width than said projection and deformable to receive said projection, said socket forming strippable shoulders disposed to normally confine said retaining edges and prevent separation of said locking projection from said socket except under a predetermined separating force.

2. The combination defined in claim 1 wherein said second part comprises a pad with a bore therein and said combination includes a securing member comprising a bolt member extending through said opening transversely to the general plane of extent of said projection and socket.

3. The combination defined in claim 2 wherein said pad is formed from a softer, more strippable material than said bracket means.

4. The combination defined in claim 3 in which said pad is formed of plastic, and said bracket means of a metal such as steel.

5. The combination defined in claim 4 in which said pad has grooves in its side edges; and said pad slips on the portion of the bracket means having the open ended aperture, with the side edges of the aperture being received in said grooves.

6. The combination defined in claim 5 in which the entrance opening leading to said socket is tapered to guide said projection into the socket.

7. A break-away bracket assembly for releasably mounting an axially extending steering column structure to steering column support structure, and for other like purposes, comprising: a part adapted to be connected to one of said structures and having a projection thereon; and a second part having a socket receiving said projection and adapted to be connected to the other of said structures; said socket having a retaining edge surface normally preventing separation of said projection from said socket, one of said projection and retaining edge surface being formed of a shearable synthetic plastic material and the other of a harder material so that said one of said projection and retaining edge surface is shearable under application of a predetermined axial separating force to permit separation of said parts.

8. In a vehicle having steering column support structure and axially extending steering column structure mountable on said support structure; steering column structure mounting means comprising: a first part connected with one of said structures and a second part connected with the other of said structures; one of said parts being connected with the other of said parts in such a manner as to be separable therefrom in an axial direction; said parts having interlocking connecting portions comprising an axially projecting head portion fixed to one portion received axially in a socket in the other portion normally maintaining the parts in locked connected relation; and one of said parts being formed of a more deformable material relative to the other so as to be shearable to permit separation of the head portion and socket upon application of a predetermined axial force in one direction on said steering column structure.

* * * * *